United States Patent [19]
Clerc

[11] Patent Number: 6,036,834
[45] Date of Patent: Mar. 14, 2000

[54] PROCESS AND DEVICES FOR THE ELECTROLYTIC FORMATION OF A DEPOSIT ON A CHOSEN GROUP OF ELECTRODES

[75] Inventor: Jean-Frédéric Clerc, Le Fontanil, France

[73] Assignee: Commissariat a l'Energie Atomique, Paris, France

[21] Appl. No.: 09/077,309

[22] PCT Filed: Oct. 1, 1997

[86] PCT No.: PCT/FR97/01735

§ 371 Date: Jun. 18, 1998

§ 102(e) Date: Jun. 18, 1998

[87] PCT Pub. No.: WO98/14637

PCT Pub. Date: Apr. 9, 1998

[30] Foreign Application Priority Data

Oct. 3, 1996 [FR] France ................................. 96 12060

[51] Int. Cl.[7] .............................. C25D 5/02; C23C 28/00; G11C 19/28; G11C 11/34
[52] U.S. Cl. .......................... 205/118; 205/123; 205/194; 377/57; 377/60; 365/183
[58] Field of Search ..................... 205/118, 123; 377/57, 60; 365/183; 204/193, 194

[56] References Cited

U.S. PATENT DOCUMENTS 4,198,635  4/1980  Gell, Jr. ............................ 343/112 PT
5,077,762  12/1991  Morimoto et al. ...................... 377/57
5,776,791  7/1998  Caillat et al. ........................ 438/15

FOREIGN PATENT DOCUMENTS 9305384    9/1995   Brazil .
256680     2/1988   European Pat. Off. .
419804     4/1991   European Pat. Off. .
WO 94/22889  10/1994   WIPO .

OTHER PUBLICATIONS

Patrice Caillat, et al., Leti (CEA–Technologies avancées–), pp. 12 to 5, "Fluxless Flip–Chip Technology"—date unavailable.

G. C. Fiaccabrino, et al., Sensors and Actuators B, vol. 18–19, pp. 675 to 677, "Array of Individually Addressable Microelectrodes", 1994—month unavailable.

*Primary Examiner*—Edna Wong
*Attorney, Agent, or Firm*—Oblon, Spivak, McClelland, Maier & Neustadt, P.C.

[57] ABSTRACT

A method and device for the electrolytic formation of a deposit on a group of electrodes of an electrolysis support. The support has a plurality of electrodes. Electric charges are selectively deposited on chosen electrodes. The support is placed in the presence of an electrolyte to produce the deposit on the chosen electrodes by electrolysis. The electric charges deposited on the electrodes provide an electrolysis current for each chosen electrode. The formed device may be used as a biological sensor.

15 Claims, 3 Drawing Sheets

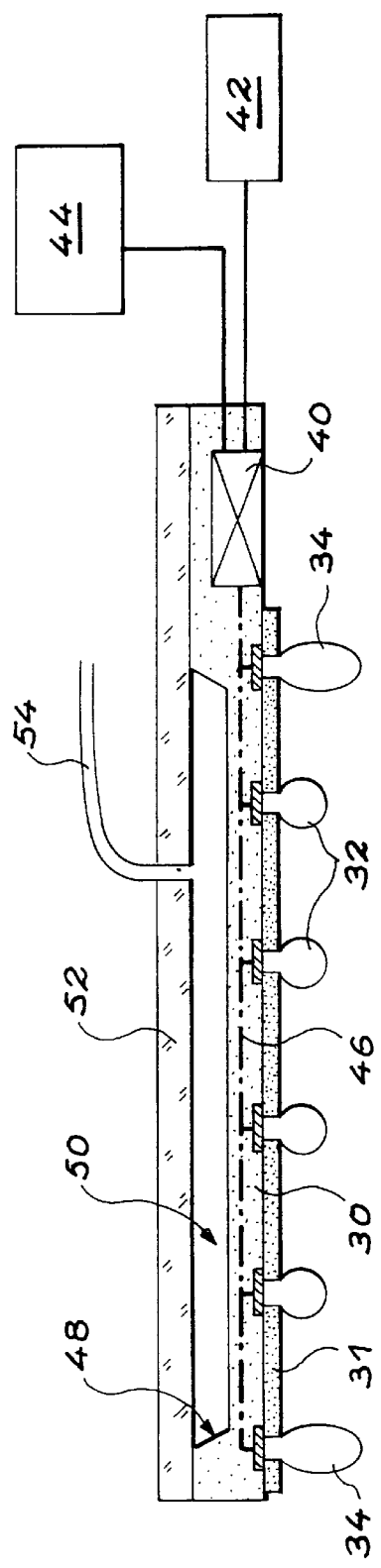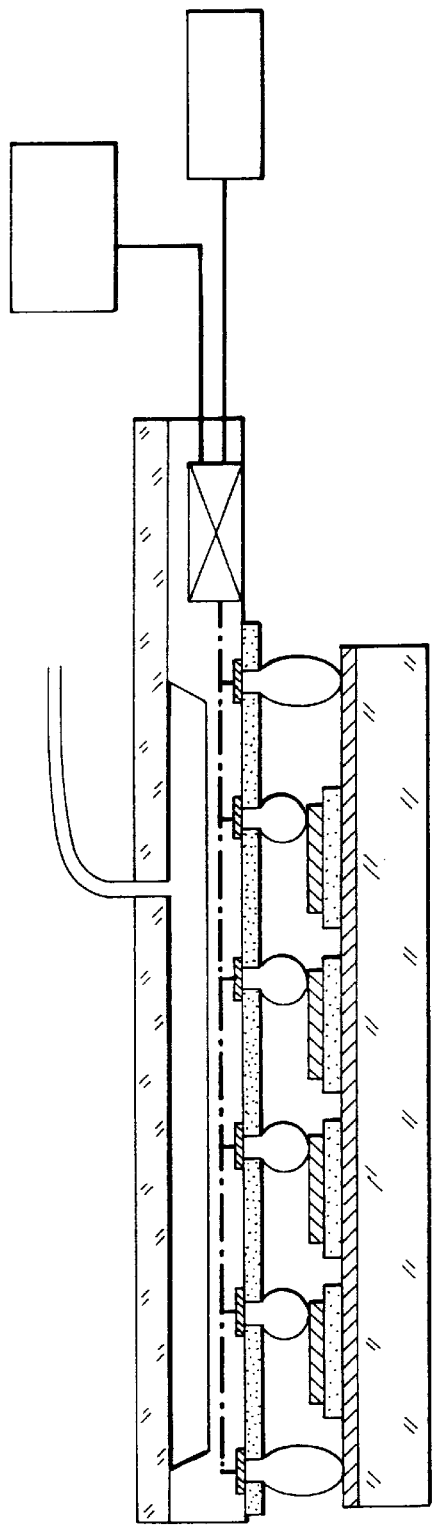

PROCESS AND DEVICES FOR THE ELECTROLYTIC FORMATION OF A DEPOSIT ON A CHOSEN GROUP OF ELECTRODES

This is a national stage application of PCT/FR97/10735, filed Oct, 1, 1997.

BACKGROUND OF THE INVENTION

Field of the Invention

The invention relates to a process and devices for the electrolytic formation of a deposit on a chosen group of electrodes of a substrate.

The invention finds application, in particular, in the manufacture of sensors or other miniaturized sensing elements in which chips having a high number of electrodes must be made. For their adaptation to their specific function in the sensor or sensing element, these electrodes must be selectively coated with appropriate materials.

As an example, the invention applies to the production of miniaturized devices such as <<biochips>> which are chips comprising an electric circuit part fabricated on a substrate, and a biological part fabricated on the surface of the chip. In this example, chemical compounds that are compatible with the biological products must be selectively deposited on the electrodes. In this respect, reference may be made to document (3) cited at the end of this disclosure.

By electrolytic formation of a deposit is meant both conventional depositing of a metal such as copper or nickel for example, and the depositing of complex compounds obtained in particular from organic substances.

DISCUSSION OF THE BACKGROUND

To form a deposit on electrodes, recourse is currently made to known microelectronics processes, such as lithography processes.

With these processes it is possible to treat a great number of chips simultaneously on one same semiconductor section in order to selectively deposit a chemical compound on determined electrodes of each chip.

As is described by document (1) whose references are given at the end of this disclosure, said depositing process comprises the following successive stages:
  depositing on the semiconductor section a continuous electric conduction base in contact with the electrodes on which a deposit is to be made,
  formation of a thin resin layer on the continuous base,
  making openings in the resin above the chosen electrodes
  electrochemical formation of the deposit material in these openings using the continuous base as an electrode, an independent counter-electrode being placed in an electrochemical bath with the semiconductor section,
  removal of the resin and the continuous base around the deposited material.

This is a conventional process. It can be used to deposit locally on one section of the substrate, for example on determined electrodes, a metal or any other chemical compound.

However, for some applications, it is necessary to coat different electrodes of one same chip with different materials, these materials being dedicated to the specific function of each electrode.

With the above-mentioned electrochemical process, in order to deposit different materials on different sites or electrodes of a semiconductor section, it is necessary to form as many layers of resin as there are different materials to be deposited. To deposit each material it is necessary to expose the areas in which the material is to be deposited and to protect the areas where no deposit is to be made.

The succession of a great number of resin depositing stages and lithography operations to make the required number of openings in each resin layer, corresponding to the electrodes which are to be coated with a given material, means that this is a complex process.

According to another technique which can be used to avoid the lithography stages and resin depositing, an electrolysis support is used having individually addressable electrodes.

Depending upon the planned number of electrodes on the electrolysis support, a direct addressing system or a multiplex addressing system may be used in the support. In this respect, reference may be made to document (2) cited at the end of this disclosure.

In the case of multiplex addressing, integrated switches are associated with the electrodes. Therefore, to make a selective electrolytic deposit, it is merely required to selectively address a given group of electrodes by operating the closure of the appropriate switches and thus applying to them the electrolysis current.

This technique is less complex than the first technique mentioned but has the disadvantage of being costly.

In this case, an often complex and costly addressing system needs to be included in each electrolysis support. Also, this addressing system is of single use for each support and becomes unnecessary when the different electrolytic deposits are completed.

It may be added that, according to the abovementioned techniques, the support comprising the electrodes must be immersed in an electrolytic bath while applying a set of polarizing or addressing voltages adapted to the addressing system of the electrodes. This may raise problems relating to the insulation or protection of the support's contact connections receiving the polarizing or addressing voltages.

SUMMARY OF THE INVENTION

The purpose of this invention is to remedy the difficulties of the above-mentioned techniques.

One purpose of the invention is, in particular, to describe a process which does not require the formation of resin masks on the electrodes that are not selected for depositing.

Another purpose of the invention is to allow the use of an electrolysis support which does not necessarily have a complex, costly addressing system.

A further purpose of the invention is to avoid addressing the electrodes while the support is immersed in an electrolytic bath.

A further purpose of the invention is also to make available an electrolysis support and a polarizing head adapted to the implementation of the process.

To reach the above-mentioned objectives, the invention sets out more precisely to describe a process for the electrolytic formation of a deposit on a group of chosen electrodes on a support, among a multiplicity of electrodes on the support. In accordance with this process:
  a support is used having on its surface the multiplicity of electrodes and comprising an electric shield, called earth shield, forming respectively with the multiplicity of electrodes a multiplicity of capacitors,
  a group of capacitors corresponding to the group of chosen electrodes is charged by depositing electric charges on these electrodes, the support is placed in the presence of an electrolyte to cause electrolytic depositing on the electrodes corresponding to the charged capacitors, the electric charges deposited on the electrodes and respectively stored in the corresponding capacitors supplying an electrolysis current for each chosen electrode.

With the process of the invention, the substrate may do without an addressing system for the electrodes. The charges may be deposited directly on the electrodes and stored in the capacitors formed by these electrodes and the earth shield. To deposit the electric charges, an electric voltage, so-called polarization voltage is, for example, applied between the earth shield and the chosen electrodes.

Also, since the charges are deposited prior to bringing the support into the presence of an electrolyte, the addressing or polarization of the electrodes during electrolysis is avoided. This therefore eliminates problems connected with protecting and insulating the contact connections for polarization and addressing in relation to the electrolyte.

The supply of electrolysis current is not made by an outside generator but comes directly from the charges stored in the capacitors corresponding to the chosen electrodes.

According to one aspect of the invention, during the electrolysis stage, the support may be immersed in an electrolytic bath or a medium containing the electrolyte, and the earth shield may be placed in contact with an electrolysis counter-electrode also immersed in the electrolytic bath.

According to one variant, the earth shield may be used directly as an electrolysis counter-electrode. In this event, the electrolysis support may either be immersed in an electrolytic bath or simply moistened with the electrolyte. For example, a thin film of electrolyte in contact with the electrodes and with at least one part of the earth shield, may be spread over the surface of the support.

According to another particular aspect of the invention, in order to selectively charge a group of capacitors, a polarizing head is used having a multiplicity of contact pads able to come into contact respectively with the multiplicity of electrodes, the polarizing head being positioned on the support in such manner as to place each electrode of the electrolysis support in contact with a corresponding contact pad of the polarizing head, and so as to bring the earth shield into contact with at least one earth contact pad in the polarizing head, and a polarizing voltage being selectively applied between each chosen electrode and the earth shield via the contact pads.

The polarizing head may comprise an addressing system, for example of multiplex type, for the selective application to the contact pads of polarizing voltages that are suitable for charging the support electrodes.

When the electrodes, and therefore the capacitors, of a support have been charged using the polarizing head, the head is separated from the support and may be used again for other supports.

Therefore, the addressing system of the polarizing head is not a single-use system.

A further purpose of the invention is an electrolysis support to implement the above-described process. The electrolysis support comprises a multiplicity of electrodes and an electric shield, so-called earth shield, that is electrically insulated from the multiplicity of electrodes and forms with said multiplicity of electrodes a multiplicity of capacitors. The electrodes and/or the earth shield, on which the charges are deposited may be in the form of an electric conductor material deposited on an insulating support.

As an example, according to one particular embodiment, the electrolysis support may comprise a support plate, a layer of electric conductor material deposited on the support plate forming the earth shield, a layer of electric insulating material placed on the layer of conductor material, and a multiplicity of electrodes of electric conductor material positioned on the layer of insulating material.

The electrodes, separated one from the other, are mutually insulated and are insulated from the earth shield by the layer of insulating material.

The earth shield forms a common electric plate in relation to which each individual electrode forms a capacitor, and the layer of insulating material forms the dielectric of the capacitors.

According to one particular aspect, the layer of insulating material may comprise at least one through hole in the areas without electrodes to expose the earth shield in these areas. This characteristic is of particular interest when the earth shield is used as a counter-electrode for electrolysis. In this case, for example, one portion of the counter-electrode may be placed in the vicinity of each electrode thereby assuring reliable, homogeneous depositing.

The openings may be designed as grooves individually surrounding each electrode.

According to one variant, the electrodes and/or the earth shield may also be in the form of doped zones formed by setting in a semiconductor support.

The electrolysis support may, for example, comprise a semiconductor substrate of a first type of conductivity and zones set in the substrate, having a second type of conductivity, opposing the first type of conductivity.

The electric insulation between electrodes is, in this case, a junction type insulation. For example, if the substrate is of P conductivity type, the electrodes are zones of N type. The substrate in this case is advantageously connected to a fixed potential chosen to avoid electrode discharge.

A further object of the present invention is a polarizing head which may be used to implement the process.

The polarizing head comprises:
 a front plate fitted with a multiplicity of contact pads placed so that they may be brought into contact respectively with the multiplicity of electrodes on the electrolysis support and with at least one earth contact pad placed so that it may be brought into contact with a contact connection of the earth shield,
 addressing means for the selective application of a polarization voltage to a group of contact pads chosen from among a multiplicity of contact pads.

As indicated above, the addressing means may be of multiplex type. The addressing means may also comprise a network of connection lines to apply appropriate voltages directly to the contact pads using an outside voltage source.

According to one particular aspect of the invention, the polarizing head may comprise a compression chamber. The front plate is then designed to form part of the wall of the compression chamber. The compression chamber may be placed under pressure to cause slight deformation of the front plate when the polarizing head is placed on the support, so that the contact pads may be firmly applied against the electrodes.

Other characteristics and advantages of the invention will be better apparent from the following description with reference to the figures of the appended drawings that are given for illustrative purposes only and are not restrictive.

BRIEF DESCRIPTION OF THE FIGURES

FIG. 4 is a section diagram of a polarizing head in accordance with the invention for the implementation of the process of the invention, FIG. 5 is a section diagram of the support in FIG. 1 and the polarizing head in FIG. 4, and illustrates one stage of selective charging of the electrolysis support in accordance with the process of the invention

DISCUSSION OF THE PREFERRED EMBODIMENTS

Figure 1:
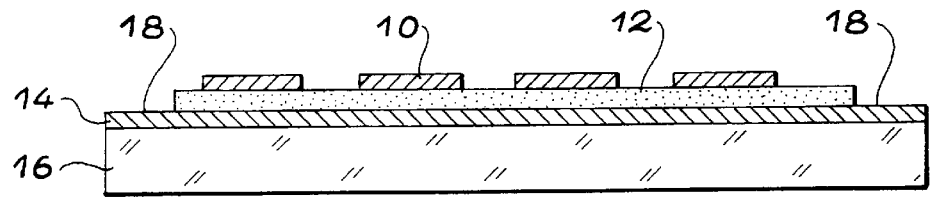
FIG. 1 is a section diagram of an electrolysis support for the implementation of the process of the invention

FIG. 1 shows an electrolysis support of the type used for the present invention. It comprises a multiplicity of electrodes 10 on which may be selectively deposited different compounds such as ligands. The latter may either be oligonucleotide probes for the recognition of DNA targets, or antigenic probes for the recognition of antibody type targets, or chemical probes for the recognition of certain molecules such as heavy ions, gases. The probes may either be grafted directly onto the electrodes or grafted or trapped in a support network such as a polymer, for example of polypyrrole, polyaniline, polythiophene type, these polymers having conduction properties making grafting easier by electrochemical means. With these deposits it is possible, for example, to fabricate biological or chemical sensors.

Electrodes 10 are formed on a layer 12 of insulating material which insulates them electrically from a layer of conductor material 14. Layer 14 forms an earth shield whose function is specified below; it is termed earth shield 14.

Layer 12 of insulating material is for example a layer of silicon oxide $SiO_2$ approximately 50 to 100 nm thick.

Earth shield 14 and electrodes 10 may, for example, be fabricated in a metal chosen from among chromium, nickel, gold, aluminium or titanium. Other conductors may however be selected, in particular for the earth shield, in relation to the compounds or substances it is desired to deposit by electrolysis. The thickness of the electrodes and earth shield is chosen for example from between 50 to 100 nm.

The group of electrodes 10, of layer 12 and the earth shield is supported by a substrate plate 16.

Substrate plate 16, whose thickness is in the region of 0.1 to several millimetres, is made of a material such as silicon, glass or plastic for example.

As shown in FIG. 1, earth shield 14 is not fully covered by layer 12 of insulating material, but one portion 18 of the earth shield, forming a contact connection is left exposed so that it is accessible through the side of the support comprising electrodes 10.

Each electrode 10 respectively forms a first capacitor plate and the earth shield forms a second plate, common to both capacitors. The capacitor associated with each electrode may therefore be charged by applying an adequate polarization or charge voltage between earth shield 14 and electrode 10 under consideration. The charges stored in the capacitors provide the electrolysis current during electrolysis for each electrode respectively.

Figure 2:
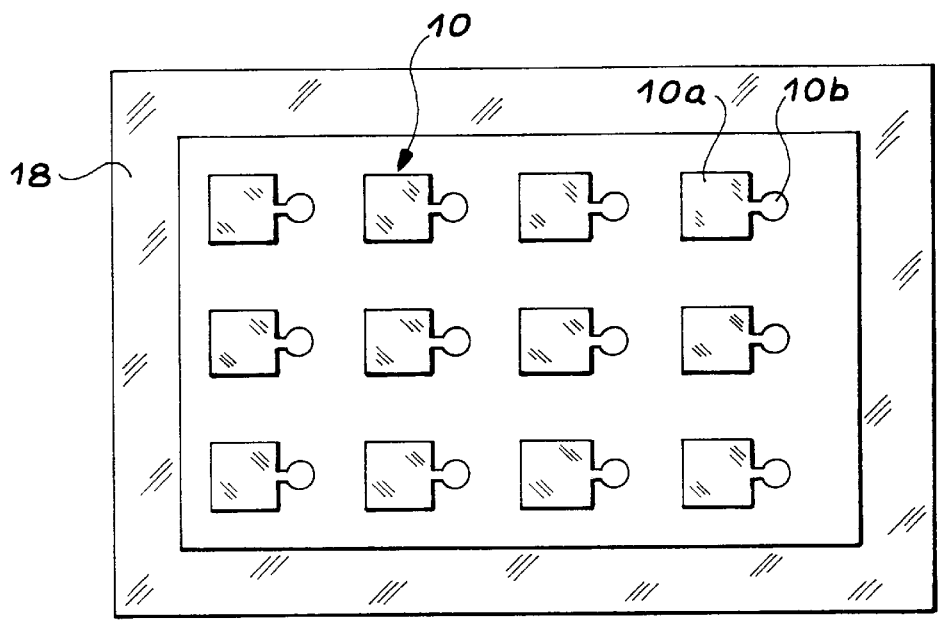
FIG. 2 is a top view of the support in FIG. 1.

FIG. 2, a top view of the support, shows an array of electrodes in rows and columns.

The electrodes in this layout are insulated from one another by the layer of insulating material 12.

In the example of FIG. 2, each electrode 10 has a portion 10a called active zone, and an appendix 10b connected to the active zone. Active zone 10a is provided for the reception of an electrolytic deposit and possibly to house a biological sensor or other sensing element depending upon the end-purpose of the electrode support. The function of appendix 10b on the other hand is essentially to serve as a contact connection. Appendix 10b is provided for the reception of a contact pad of a polarizing head described below, for the purpose of charging the capacitor corresponding to the electrode.

Finally, FIG. 2 shows that, in the illustrated mode of embodiment, portion 18 of earth shield 14 forming a contact connection surrounds the layer of insulating material 12 forming a border contour.

Figure 3:
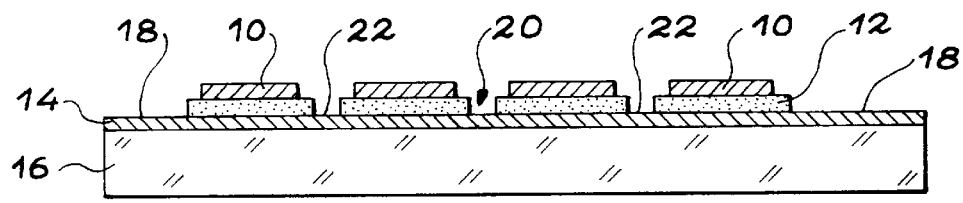
FIG. 3 is a section diagram of one variant of embodiment of the electrolysis support for the implementation of the process of the invention.

FIG. 3 shows a further possible embodiment of the electrolysis support.

In the mode of embodiment shown in FIG. 3, layer 12 of insulating material is etched so that openings 20 may be made on it between electrodes 10. Openings 20, for example in the form of grooves, are used to expose portions 22 of earth shield 14 in the vicinity of electrodes 10. For example, each electrode may be surrounded by a groove cut in the layer of insulating material.

The use of openings 20 and portions 22 of the earth shield that are exposed, becomes especially apparent during electrolysis when the earth shield is used directly as a counter-electrode for electrolysis. This point is described in more detail below.

The capacitors associated with the chosen electrodes of the support may possibly be charged one by one, in particular when there are few electrodes.

However, especially when there is a high number of electrodes, it is possible to use a polarizing head for this operation, of which one example is given in FIG. 4.

The polarizing head comprises a front plate 30 fitted with a multiplicity of contact pads 32 in the form of beads and metal pads. The metal beads are for example beads in indium-lead alloy. They are given shape by heat treatment using a layer 31 of insulating material that has no wetting properties vis-à-vis the beads and covers the surface of front plate 30.

The number of contact pads and the distribution of the contact pads 32 on the surface of front plate 30 respectively correspond to the number of electrodes 10 and the distribution of electrodes 10 on the surface of an electrolysis support such as shown in FIGS. 1 to 3.

Therefore, when the polarizing head is positioned on the electrolysis support, the beads which form contact pads come into contact respectively with electrodes 10, and more precisely with appendices 10b of these electrodes.

The polarizing head also comprises one or several additional pads 34 placed around the periphery, provided to come into contact with contact connection 18 of earth shield 14 of the electrolysis support (see FIGS. 1 to 3). Pads 34 are formed by beads having, in this example, a diameter that is slightly larger than that of the beads forming pads 32.

Front plate 30, in silicon for example, may comprise an addressing electronic circuit 40, connected to an outside voltage generator 42. Circuit 40, driven by an outside control computer 44, is designed to apply selectively to a chosen group of contact pads 32 a polarizing voltage supplied by generator 42.

Addressing circuit 40 may comprise pad addressing rows and columns. Each contact pad is connected via a transistor to an addressing row and column. Therefore, the application of the polarizing voltage to a given contact pad results from activating the conduction of the corresponding transistor. Such multiplex addressing is itself known as such and used, for example, to control liquid crystal display screens.

The addressing rows and columns are symbolically represented by a chain-dotted line carrying the reference 46.

The rear surface of front plate 30 may be etched so that it has a slot 48 in the area comprising contact pads 32.

Front plate 30 is also glued to a plate 52 which acts as cover for slot 48. Plate 52 is also in silicon.

The slot thus forms a chamber, called a compression chamber 50, whose walls are formed by the cover plate and front plate.

Compression chamber 50 is connected to a pressurized air inlet 54. Front wall 30 is also designed with sufficient elasticity so that it undergoes slight deformation in response to pressurization of chamber 50. The use of this deformation can be seen in FIG. 5.

FIG. 5 shows the use of the polarizing head in FIG. 4 to selectively charge the capacitors corresponding to the electrodes of an electrolysis support as in FIG. 1.

As is shown by FIG. 5, the polarizing head is positioned on the support in such manner that each contact pad 32 comes up against a corresponding electrode 10 of the electrolysis support, and so that additional pads 34 come up against contact connection 18 of the earth shield. It will be noted in this respect that the slightly larger diameter of the beads of contact pads 34 allows for compensation of the thickness of the layer of insulating material 12 and the thickness of electrodes 10.

When the polarizing head is positioned and maintained mechanically (as is the case in microelectronics aligning machines) against the electrolysis support, pressurized air enters compression chamber 50. The pressure established in chamber 50 exceeds surrounding pressure by 0.1 bar or more.

Under the effect of the pressure, the front plate undergoes slight deformation in the direction of the support comprising the electrodes. Contact pads 32 are therefore firmly applied against electrodes 10. This arrangement guarantees good contact between these parts.

When contact between the contact pads and the electrodes is established, the addressing circuit is operated so that it applies an earth (or ground) voltage to earth shield 14 of the electrolysis support and applies a voltage V to the chosen electrodes. The earth voltage is applied to the earth shield via contact pads 34 while voltage V is applied to the chosen electrodes by contact pads 32. Advantageously, an earth voltage may also be applied to non-selected electrodes.

The capacitors associated with the electrodes receiving polarization voltage V store a charge Q such that Q=CV, in which C is the capacity of the capacitor associated with each electrode. The capacitors associated with the electrodes which receive a polarizing voltage, equal to the earth voltage (non-selected electrodes) store a zero charge.

The polarization of the chosen electrodes may be concomitant or sequential.

Figure 6:
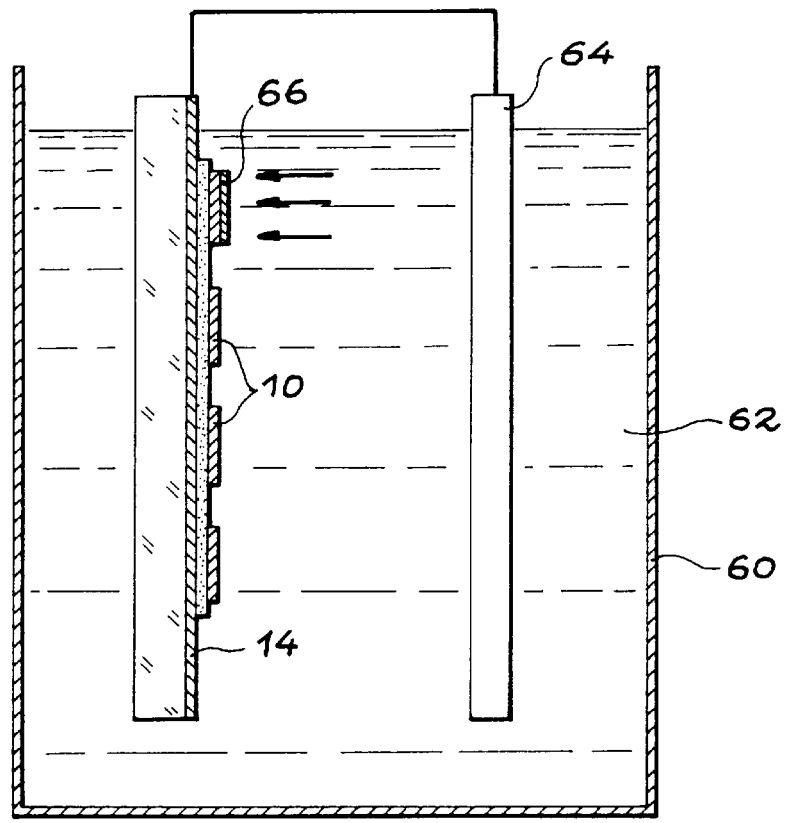
FIG. 6 is a section diagram of an electrolysis bath containing an electrolysis support in accordance with FIG. 1.

FIG. 6 shows a subsequent stage of the process of the invention which is the electrolysis stage. The electrolysis support whose capacitors corresponding to the chosen electrodes are charged, is immersed in a tank 60 containing an electrolytic bath 62.

A counter-electrode 64 is also immersed in the bath and electrically connected to earth shield 14 of the electrolysis support.

Electrolysis takes place by transfer of stored charges in the capacitors associated with the selected electrodes. Charge transfer takes place between the chosen electrodes and the counter-electrode and causes the formation of an electrolytic deposit 66 on the chosen electrodes. In the Figure, charge transfer is symbolized by the arrows.

Figure 7:
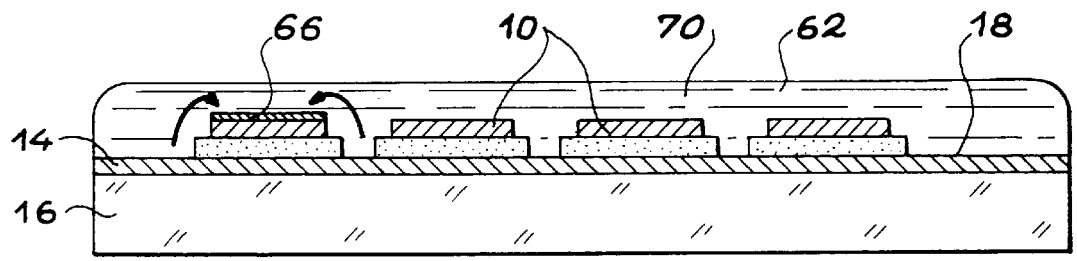
FIG. 7 is section view of a support in accordance with FIG. 3, and illustrates one stage of electrolysis on this support in accordance with the invention.

FIG. 7 shows a variant of implementation of the electrolysis stage using an electrolysis support according to FIG. 3.

In the case shown in FIG. 7, only a thin film of electrolyte 70 is deposited on the surface of the support comprising electrodes 10. The electrolyte film wets the group of electrodes 10 and the earth shield on portion 18 forming a contact connection and in openings 20.

In the case shown in FIG. 7, the earth shield forms the counter-electrode for electrolysis.

Charge transfer, symbolized by arrows, takes place between the earth shield (in openings 20) and the chosen electrodes 10.

Charge transfer creates an electrolytic current which allows formation of a deposit 66 on the chosen electrodes. When the capacitors corresponding to the chosen electrodes are discharged under the effect of the electrolysis current, depositing stops.

The electrolysis support is then rinsed and dried. It may undergo a new charge with the polarizing head choosing other electrodes for a further deposit of different material for example.

In this way the electrolysis support may selectively undergo several deposits with different electrolytes.

List of Documents Cited in This Application (1) <<Fluxless Flip-Chip Technology>> by P. Caillat and G. Nicolas—LETI (CEA-Advanced technologies)

(2) <<Array of individually addressable microelectrodes>> by G. C. Fiaccabrino et al. In <<Sensors and Actuators>> B, 18–19, pp. 675–677

(3) WO 94/22889

I claim:

1. A process for the electrolytic formation of a deposit on a group of electrodes of a support chosen from among a multiplicity of electrodes on the support, wherein the support used has on its surface the multiplicity of electrodes and comprises an electrically conductive plate respectively forming with the multiplicity of electrodes a multiplicity of capacitors, comprising:

selectively charging a group of capacitors corresponding to the group of chosen electrodes by depositing electric charges on the group of electrodes; and placing the support in contact with an electrolyte to cause electrolytic depositing on the electrodes corresponding to the charged capacitors, the electric charges deposited on the electrodes and stored in the corresponding capacitors respectively providing an electrolysis current for each of the chosen electrodes.

2. A process in accordance with claim 1, comprising:
   using an electrolysis counter-electrode in electrical contact with the plate.

3. A process in accordance with claim 1, comprising:
   using the plate as a counter-electrode for electrolysis.

4. A process in accordance with claim 1, comprising:
   in order to selectively charge said group of capacitors, using a polarizing head having a multiplicity of contact pads able to come into contact respectively with the multiplicity of electrodes, positioning the polarizing head on the electrolysis support in such manner as to bring each electrode of the electrolysis support into contact with a corresponding contact pad of the polarizing head, and bringing the electrically conductive plate into contact with at least one contact pad of the polarizing head, the charges being deposited selectively on the chosen electrodes via contact pads.

5. A system, comprising:

an electrolysis support having a multiplicity of electrodes and an electrically conductive plate, electrically insulated from the multiplicity of electrodes, the electric plate forming with said multiplicity of electrodes a multiplicity of capacitors;

a front plate fitted with a multiplicity of contact pads, placed in such manner that they may be placed in contact respectively with the multiplicity of electrodes on the electrolysis support, and with at least one contact pad positioned so that it can be brought into contact with a contact connection of the plate; and addressing means to selectively apply a polarizing voltage to a group of contact pads chosen from among the multiplicity of contact pads.

6. A system in accordance with claim 5, in which, in the electrolysis support, the electrodes and/or the plate are formed of an electric conducting material.

7. A system of claim 5, wherein said support comprises a support plate, said electrically conductive plate comprising a layer of electric conducting material placed on the support plate forming an earth shield, a layer of electric insulating material placed on the layer of conducting material, and the multiplicity of electrodes comprising an electric conductor material placed on the layer of insulating material.

8. A system in accordance with claim 7, in which the layer of insulating material comprises at least one opening in the areas without the electrodes to expose the earth shield in these areas.

9. A system in accordance with claim 8, wherein the opening is a groove surrounding each of the electrodes.

10. A system in accordance with claim 5, in which the electrodes and/or the plate are doped zones of a semiconductor support.

11. A system in accordance with claim 10, comprising a semiconductor substrate of a first conductivity and zones set in the substrate having a second conductivity, opposed to the first conductivity.

12. A system in accordance with claim 5, in which the contact pads comprise contact beads.

13. The system of claim 5, wherein the plate comprises an earth shield.

14. A polarizing head, comprising:

an electrolysis support having a multiplicity of electrodes and an electrically conductive plate;

a front plate fitted with a multiplicity of contact pads, placed in such manner that they may be placed in contact respectively with the multiplicity of electrodes on the electrolysis support, and with at least one contact pad positioned so that it can be brought into contact with a contact connection of the plate;

addressing means to selectively apply a polarizing voltage to a group of contact pads chosen from among the multiplicity of contact pads; and a compression chamber, the front plate forming one portion of a wall of the compression chamber, and in which the compression chamber may be placed under pressure to produce slight deformation of the front plate when the polarizing head is placed on the electrolysis support, so that the contact pads may be firmly applied against the electrodes.

15. The system of claim 14, wherein the plate comprises an earth shield.

* * * * *